US011519507B2

(12) United States Patent
Erdemir et al.

(10) Patent No.: US 11,519,507 B2
(45) Date of Patent: Dec. 6, 2022

(54) GRAPHENE EMBEDDED SEAL

(71) Applicant: UCHICAGO ARGONNE, LLC, Chicago, IL (US)

(72) Inventors: Ali Erdemir, Naperville, IL (US); Vanessa DaSilva, Countryside, IL (US); Osman Levent Eryilmaz, Plainfield, IL (US)

(73) Assignee: UChicago Argonne, LLC, Chicago, IL (US)

( * ) Notice: Subject to any disclaimer, the term of this patent is extended or adjusted under 35 U.S.C. 154(b) by 87 days.

(21) Appl. No.: 17/036,984

(22) Filed: Sep. 29, 2020

(65) Prior Publication Data

US 2022/0099186 A1 Mar. 31, 2022

(51) Int. Cl.
*F16J 15/16* (2006.01)
*F16J 15/3284* (2016.01)
*B29B 7/94* (2006.01)
*F16J 15/328* (2016.01)

(52) U.S. Cl.
CPC ............ *F16J 15/162* (2013.01); *B29B 7/945* (2013.01); *F16J 15/328* (2013.01); *F16J 15/3284* (2013.01)

(58) Field of Classification Search
CPC .... F16J 15/00; F16J 15/16; F16J 15/50; F16J 15/52; F16J 15/162; F16J 15/324; F16J 15/3404; F16J 15/40; F16J 15/328; F16J 15/3284; F16J 15/3288; F16J 15/3292; B29B 7/945
USPC .......................................... 277/549
See application file for complete search history.

(56) References Cited

U.S. PATENT DOCUMENTS

| | | | |
|---|---|---|---|
| 2016/0115293 A1* | 4/2016 | Aksay | ........ C08K 3/04 524/496 |
| 2016/0237754 A1* | 8/2016 | Sui | ........ F16J 15/3284 |
| 2019/0367371 A1* | 12/2019 | Lin | ........ C01B 32/23 |
| 2019/0367372 A1* | 12/2019 | Lin | ........ C01B 32/184 |

* cited by examiner

*Primary Examiner* — Nathan Cumar
(74) *Attorney, Agent, or Firm* — Foley & Lardner LLP (57) ABSTRACT

Systems and processes for forming seals. The seals have graphene embedded in the seal. The graphene-embedded seals exhibit improved wear resistance over seals without graphene.

19 Claims, 11 Drawing Sheets

Untested area 01 used for Raman analysis
(50x magnification)

FIG 4B

Untested area 02 used for Raman analysis
(50x magnification)

FIG. 4C

Untested area 03 used for Raman analysis
(50x magnification)

Tested area 01 used for Raman analysis (50x magnification)

FIG 5B

Tested area 02 used for Raman analysis (50x magnification)

FIG. 5C

Tested area 03 used for Raman analysis (50x magnification)

Top cross sectional area used for Raman analysis (trial 1b)

FIG 8B

Middle cross sectional area used for Raman analysis (trial 2d)

FIG. 8C

Bottom cross sectional area used for Raman analysis (trial 3a)

Top cross sectional area used for Raman analysis (trial 1a)

FIG 10B

Middle cross sectional area used for Raman analysis (trial 2c)

FIG. 10C

Bottom cross sectional area used for Raman analysis (trial 3e)

GRAPHENE EMBEDDED SEAL

STATEMENT OF GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present disclosure relates to a method of manufacturing a seal, specifically a seal comprising graphene.

BACKGROUND

Seals are a ubiquitous component in a wide range of devices. In many common applications, seals serve to seal an environment and are often positioned at the interface between two components. Some seals also operate in an environment where one or more components that engage the seal moves relative to the seal. The movement may take various forms, but results in wear. Traditional seal materials, such as many commercial polymers, such as polytetrafluoroethylene ("PTFE"), are susceptible to wear in part because of some of the properties that make them desirable as a seal. A material that can function as a seal while having increased, relative to the base material of the seal, wear resistance is highly desirable for a range of materials.

SUMMARY

One embodiment relates to a method of forming a graphene-embedded seal. The method comprises mixing graphene and alcohol forming a graphene alcohol solution, exposing a polymeric material to the graphene alcohol solution, and evaporating alcohol from the graphene alcohol solution, depositing graphene within the polymeric material. In one embodiment, the polymeric material is a polymer powder. In another embodiment, the polymeric material is a polymer seal.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Described herein are systems and processes relating to graphene-embedded seals. Methods described herein, in some embodiments, include the infiltration of graphene solution into porous polymer seals, either in their final form such as post-sintering or in an intermediate form such as by application of a graphene solution to powdered polymer precursor materials, such as monomeric powder pre-polymerization or polymeric powdered materials pre-sintering.

In one embodiment, the seals comprise organic material. For example, the seals may be, prior to embedding of the graphene, a polymeric seal, such as PTFE. In one embodiment, the graphene-embedded seal comprises polymer and carbon in the form of graphite and/or graphene. In a further embodiment, the carbon is graphene. Graphite or other non-graphene carbon may be utilized in the formation of seals to impart rigidity and strength to the final seal product. Graphene is also utilized in the formation of the seals to impart wear resistance via a reduction in friction.

In one embodiment, the graphene solution is an alcohol solution, such an alcohol in which graphene forms a solution for example ethanol. The alcohol may, in some embodiments, be an alcohol which is non-reactive with the polymer. The alcohol may, in some embodiments, be an alcohol which results in swelling phenomenon when the polymer is soaked. The graphene solution may have a concentration as desired to achieve an end result of graphene content in embedded in the seal, such as 0.1-10 mg/L, for example 0.5-1.5 mg/L, such as about 1 mg/L. The graphene may be graphene flakes (e.g., monolayer graphene flakes or platelets), such as having an average lateral size of 150-3000 nm, for example an average of about 550 nm.

Figure 1:
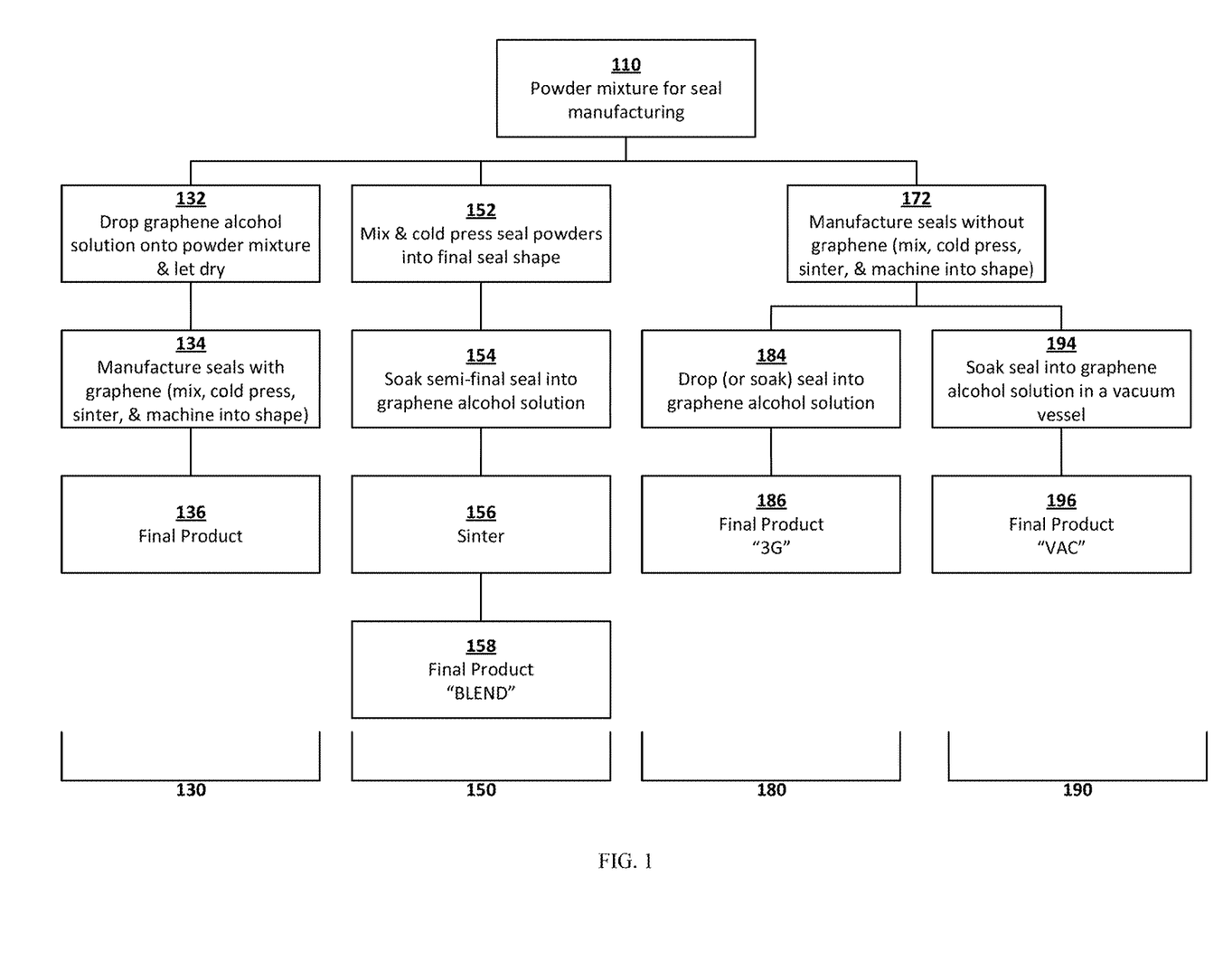
FIG. 1 is a flow chart illustrating one embodiment of a process for forming a graphene-embedded seal.

FIG. 1 shows processes 130, 150, 180, 190 for forming seals wherein graphene alcohol solution is exposed to a polymeric material, which may be, for example, polymer seals or polymer powder. In one embodiment, the graphene-embedded seal exhibits a 30-50% reduction in the coefficient of friction ("COF") over an otherwise identical seal lacking graphene. In one embodiment, graphene is located within the bulk of the polymer rather than on the surface, such as at a subsurface within the polymer.

In one embodiment, process 130 illustrates a method of forming seals by graphene alcohol solution on powder. At 132, graphene alcohol solution is "solution processed," such as by applying solution to a powder polymer mix, such application may be drop-wise (i.e., dropped onto powder polymer mixture). At 134, seal is formed by mixing, cold pressing and, if necessary, machining. At 136, a final product is formed with carbon embedded in the seal.

In an alternative embodiment, the process 150 forms a "blend" product. At step 152, polymeric seals precursors are formed by mixing and cold pressing the seal powders into a final seal shape according to conventional techniques. At 154, the pressed seal powder is soaked in a graphene alcohol solution, such as ethanol, for example as a 1 mg/L solution of monolayer graphene flakes. The soaking proceeds for 1-7 seconds, such as 3-5 seconds, at room temperature and atmospheric pressure, for example. The graphene solution fills the pores of polymer seal. The alcohol is evaporated, such as with room temperature or via elevated temperature. At 156, the soaked polymer powder is sintered to form the final graphene embedded polymer seal. The graphene remains as deposited within the pores, thus resulting in a graphene-embedded seal. In some embodiments, the soaked polymer powder may be dried separately prior to sintering, or the sintering may be utilized to evaporate the alcohol. The dried graphene-embedded seal is sintered, such as in air or nitrogen, by known techniques used for seals produced from polymer pressed powder. At 136, a final blend product is formed.

In an example embodiment, a process 180 embeds graphene into a formed polymer seal. After the polymer seal is manufactured at step 172, at 184, the graphene is immersed in an alcohol in which graphene is soluble (e.g., ethanol) to form a graphene-alcohol solution. The solution is deposited, such as by droplet or otherwise dispensing the alcohol and graphene, onto a polymer seal. Alternatively, or in addition the polymer seal may be immersed in the graphene alcohol solution. The graphene alcohol solution penetrates into the pores of the polymer seal. The graphene alcohol solution is allowed to dry at 186 such that the alcohol evaporates, leaving deposited graphene, such as within the pores of the polymer seal, forming a final 3G product.

In another embodiment, vacuum process 190 is utilized. After the polymer seal is manufactured at step 172, the polymer seal is soaked in a vessel under pressure at step 194. The polymer seal in solution may be exposed to a pressurized environment or a vacuum environment. For example, the vacuum environment may aid in facilitating the graphene alcohol solution entering the polymer pores by evacuating air from the pores. In one embodiment, the polymer seal is placed under vacuum and then the graphene alcohol solution is exposed to or used to immerse the polymer seal pressurized immersion is utilized where the dried graphene-embedded seal is immersed in a graphene alcohol solution in a pressurized vessel. The pressure-treated or vacuum-treated graphene-embedded seal is dried at step 196.

For embodiments using a vacuum, the resulting seal is removed at step 196 to provide a final product "VAC," as referred to below regarding testing results. It is believed the application of the vacuum aids in the penetration of the graphene into the bulk of the polymer seal as it involves infiltration of graphene alcohol solution into porous semi or final seal product. Infiltration can be done in atmospheric pressure by dipping seals into graphene alcohol solution for 5-10 seconds, removing and drying in air. Alternatively, a vacuum vessel can be used to remove air and force graphene alcohol solution into seal pores to achieve deeper penetration.

In embodiments utilizing the vacuum method, the seal is soaked into graphene alcohol solution in a vacuum vessel and air is pumped out by a rotary pump for at least 5-6 minutes. For embodiments utilizing pressure, a pressure of 2-50 atmospheres may be used for 5-15 minutes.

Experimental Procedure.

Experimental testing was performed on a commercially available seal without exposure to graphene ("base"), a graphene-embedded seal produced by the solution processing as described above ("3G"), and a graphene-embedded seal produced by the immersion process described above ("blend"). For the experiments described herein, the wear testing included simulation of natural gas compressor working conditions. Table 1 below illustrates a summary of the testing parameters and analytical results.

TABLE 1

Testing parameters and analytical results.

| Sample | Base (FIG. 2A) | Base 3G (FIG. 2B) | Base Blend (FIG. 2C) |
|---|---|---|---|
| Ref. No. | 190715b | 190716a | 190712a |
| Lubricant | | 10 μL Mobil DTE | |
| Wear Test | | 100° C., 15 mm, 5 Hz, 300N, 2 hr | |

TABLE 1-continued

Testing parameters and analytical results.

| Sample | Base (FIG. 2A) | Base 3G (FIG. 2B) | Base Blend (FIG. 2C) |
|---|---|---|---|
| Parameters | | | |
| Wt. Loss | 10.9 mg (0.634%) | +0.70 mg (0.041%) | +1.56 mg (0.095%) |
| Analytical Results | Sa 109.29186 nm | Sa 193.57566 nm | Sa 186.689 nm |
| | Sku 4.34973 | Sku 8.46835 | Sku 8.20797 |
| | Sp 1.68196 μm | Sp 1.70102 μm | Sp 1.4464 μm |
| | Sq 251.3621 nm | Sq 277.66162 nm | Sq 255.72378 nm |
| | Ssk −0.15631 | Ssk −1.38819 | Ssk −1.22412 |
| | Sv −1.736594 μm | Sv −3.95298 μm | Sv −3.93921 μm |
| | Sz 3.41791 μm | Sz 5.654 μm | Sz 5.38561 μm |

Figure 2A:
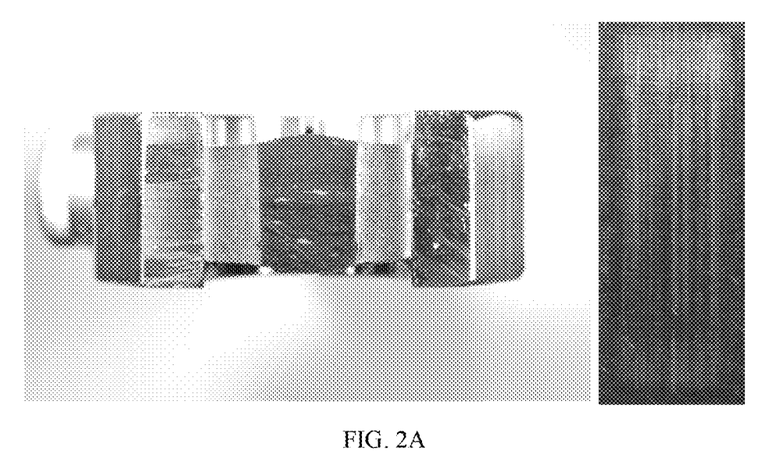
FIG. 2A is a photograph of experimental results for a commercial seal (referred to herein as "base").
Figure 2B:
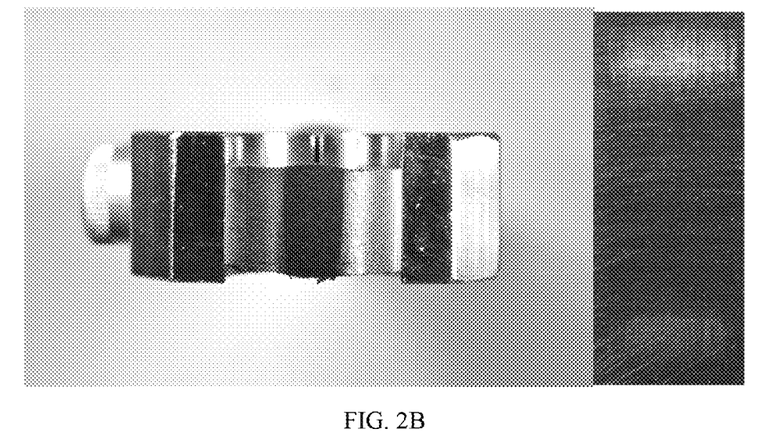
FIG. 2B is a photograph of experimental results for one embodiment of a graphene-embedded seal formed by solution processing using 3 drops of graphene-alcohol solution (referred to herein as "3G").
Figure 2C:
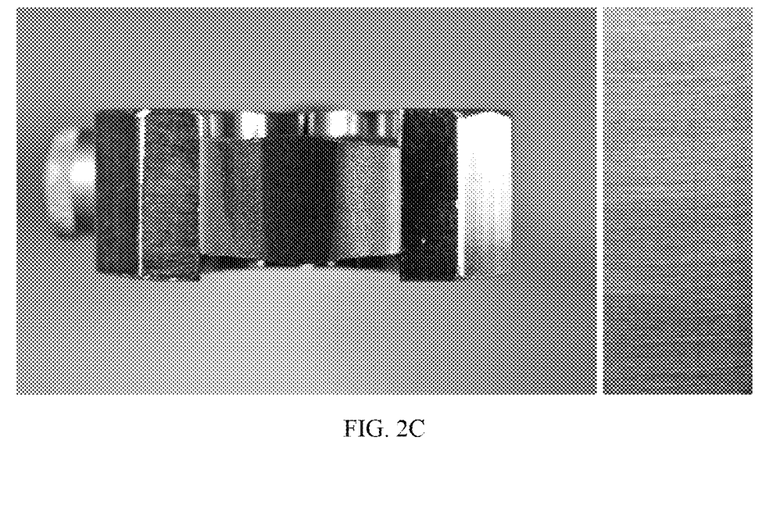
FIG. 2C is a photograph of experimental results for one embodiment of a graphene-embedded seal formed by immersion (referred to herein as "blend").

FIG. 2A is a photograph of experimental results for a commercial seal (base). FIG. 2B is a photograph of experimental results for one embodiment of a graphene-embedded seal formed by solution processing using 3 drops of graphene-alcohol solution (3G). FIG. 2C is a photograph of experimental results for one embodiment of a graphene-embedded seal formed by immersion (blend).

Figure 3:
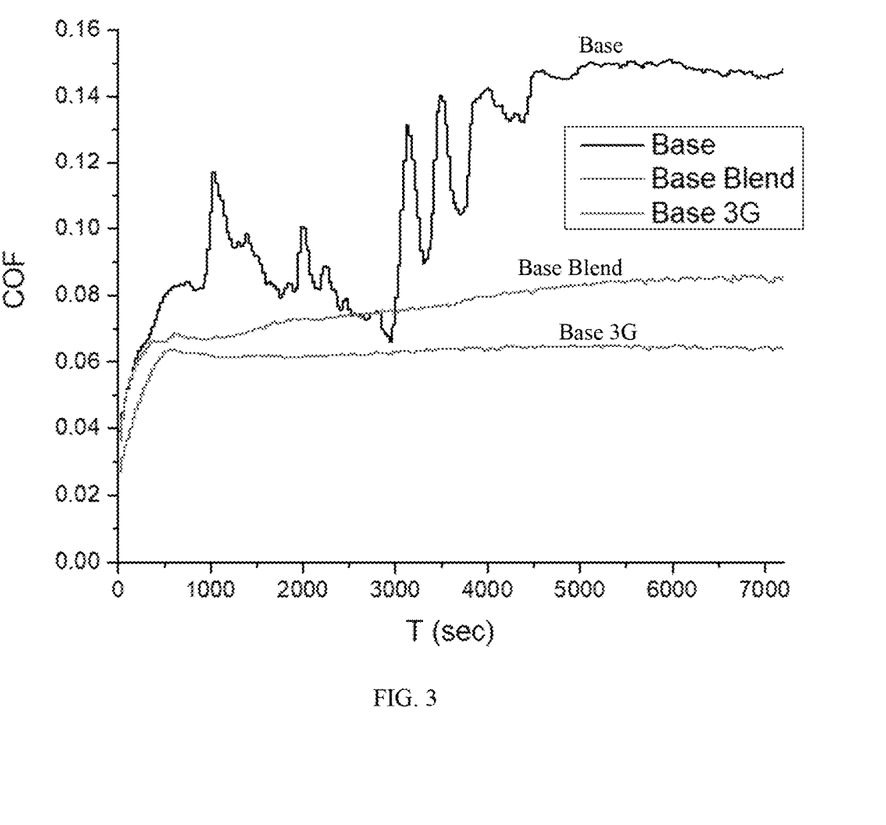
FIG. 3 is a graph of testing results for base, blend, and 3G samples.

FIG. 3 is a graph of testing results for a base, blend, and 3G samples. After an initial wear-in period, the COF for the commercial "base" seal continues to fluctuate, while 3G embodiment of a graphene-embedded seal by virtue of a solution process reached near steady state rising from about 0.065-0.08 COF from 1000-7000 seconds and the blend embodiment of a graphene-embedded seal by virtue of immersion reached steady state at about 0.06. Table 2 below summaries the further results.

TABLE 2

Summary of results (all COF).

| | N Total | Mean | Standard Deviation | Sum | Minimum | Median | Maximum |
|---|---|---|---|---|---|---|---|
| Base | 6234 | 0.11519 | 0.03224 | 718.08613 | 0.03909 | 0.12213 | 0.15103 |
| Blend | 6234 | 0.07661 | 0.0081 | 477.58508 | 0.03621 | 0.07701 | 0.086 |
| 3G | 6234 | 0.06234 | 0.00496 | 388.59827 | 0.02702 | 0.06373 | 0.06504 |

Figure 4A:
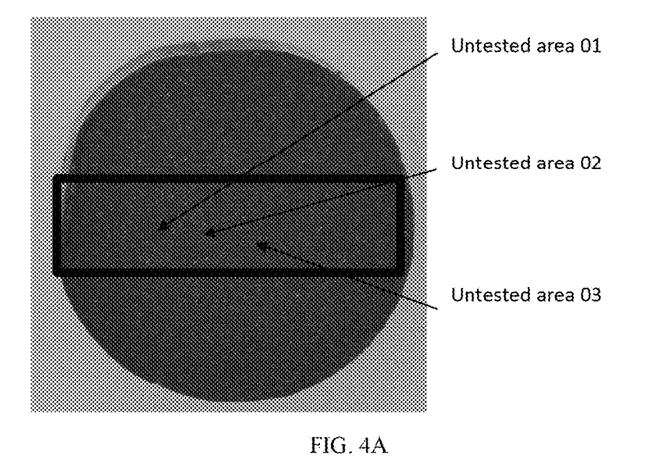
FIG. 4A shows a base seal with untested areas 1, 2, and 3 corresponding to the micrograph images in FIGS. 4B, 4C, and 4D, respectively.
Figure 4B:
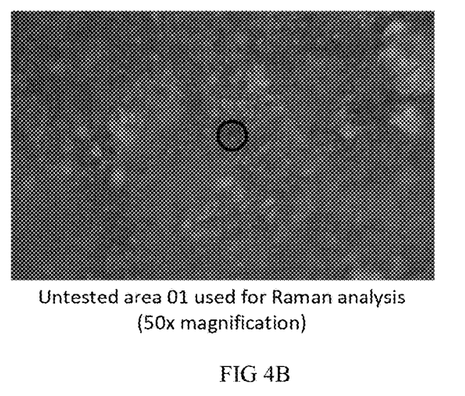
Figure 4C:
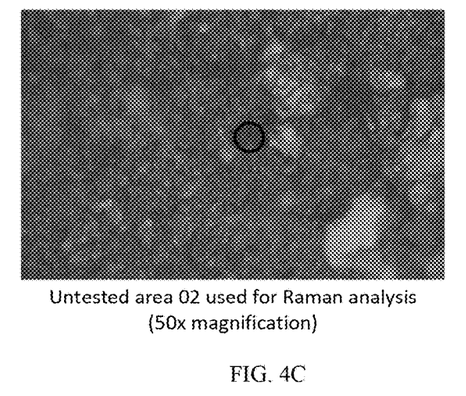
Figure 4D:
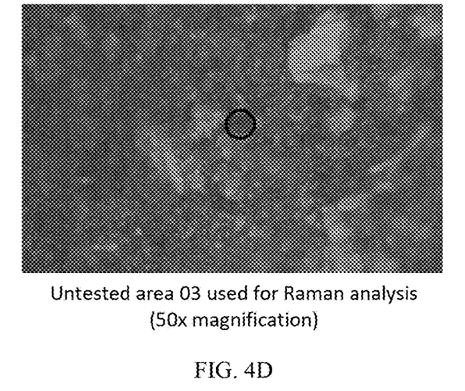
Figure 5A:
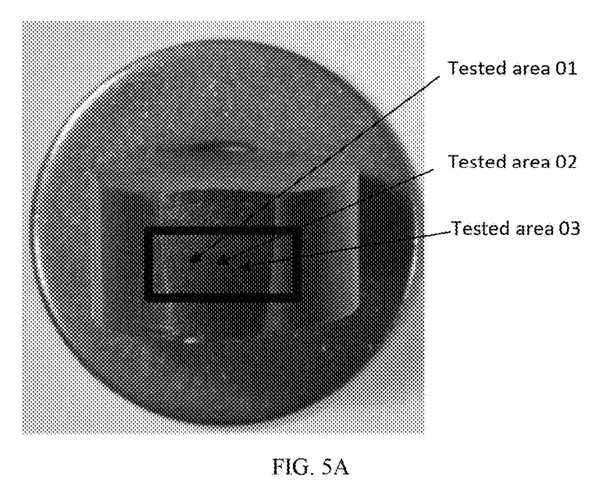
FIG. 5A shows a base seal with tested areas 1, 2, and 3 corresponding to the micrograph images in FIGS. 5B, 5C, and 5D, respectively.
Figure 5B:
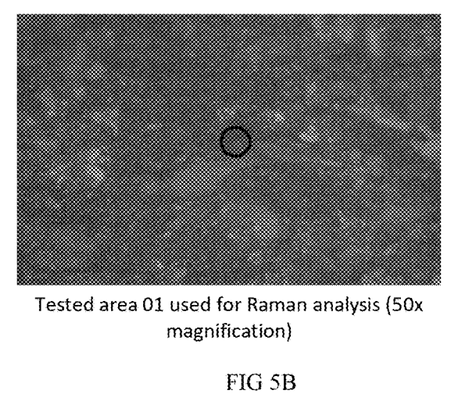
Figure 5C:
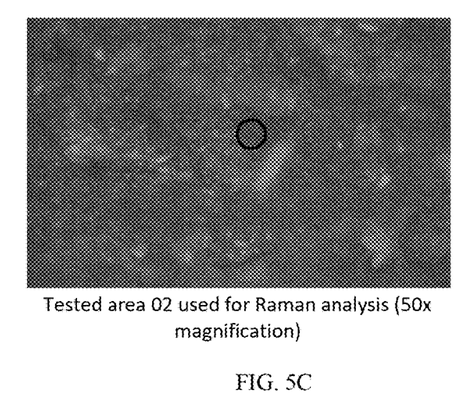
Figure 5D:
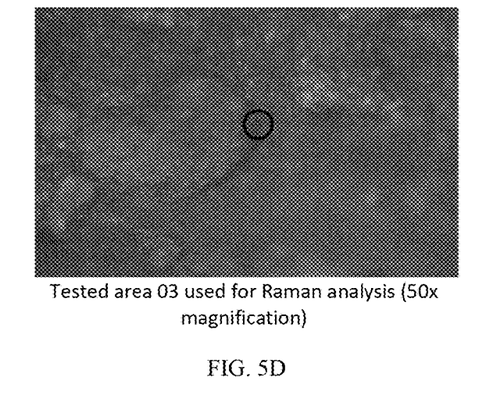
Figure 6:
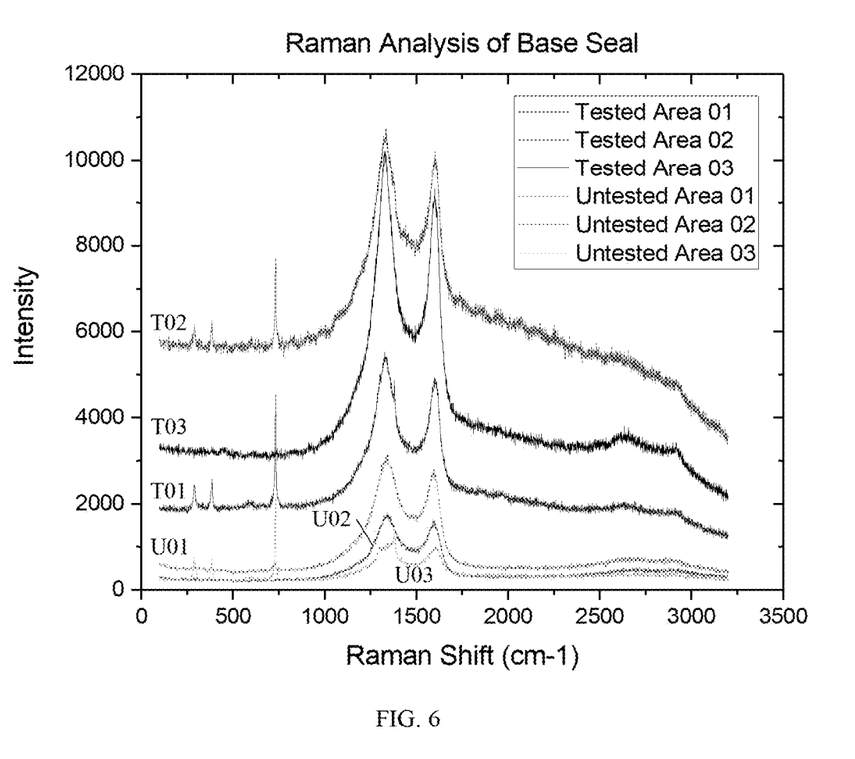
FIG. 6 is a graph of Raman analysis results for the indicated locations in FIGS. 4A-4D and FIGS. 5A-5D.
Figure 7:
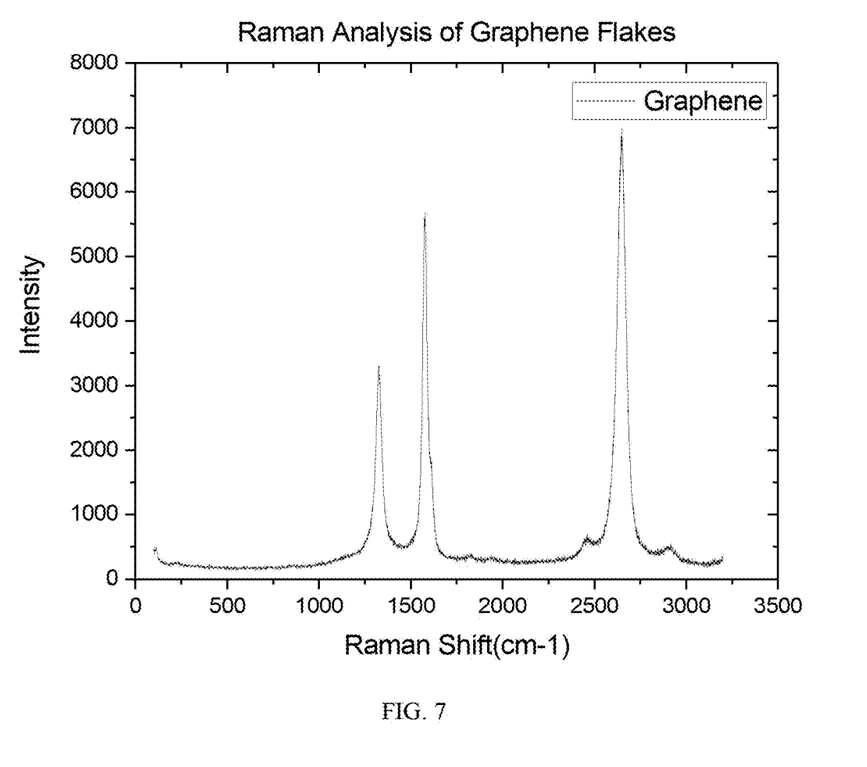
FIG. 7 is a reference Raman analysis for stock graphene flakes for comparative purposes.

As a control, a commercially available seal ("base") was analyzed both at untested portions and as subject to wear testing. FIG. 4A shows a base seal with untested areas 1, 2, and 3 indicated corresponding to the micrograph images in FIGS. 4B, 4C, and 4D, respectively. FIG. 5A shows a base seal with tested areas 1, 2, and 3 indicated corresponding to the micrograph images in FIGS. 5B, 5C, and 5D, respectively. FIG. 6 is a graph of Raman analysis results for the indicated locations in FIGS. 4A-4D and FIGS. 5A-5D. FIG. 7 is a reference Raman analysis for stock graphene flakes for comparative purposes. A comparison of Raman results illustrates that the base seal lacks graphene.

Figure 8A:
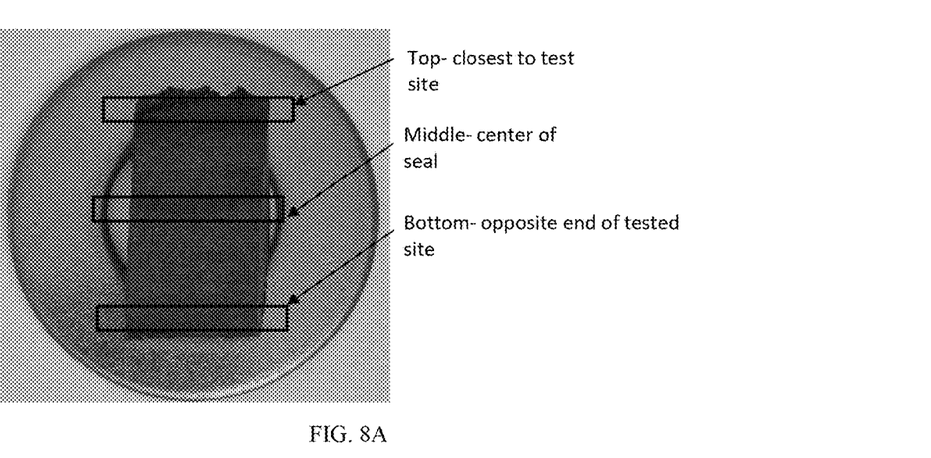
FIG. 8A shows a blend seal with a top, middle, and bottom areas corresponding to the micrograph images in FIGS. 8B, 8C, and 8D, respectively.
Figure 8B:
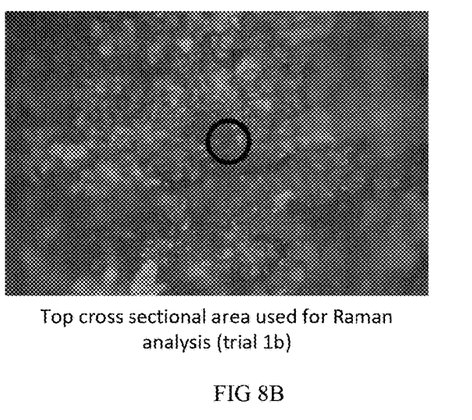
Figure 8C:
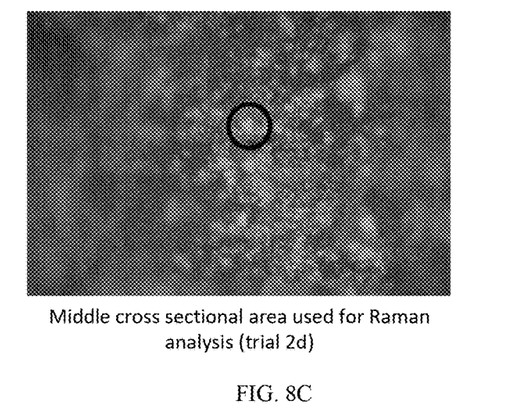
Figure 8D:
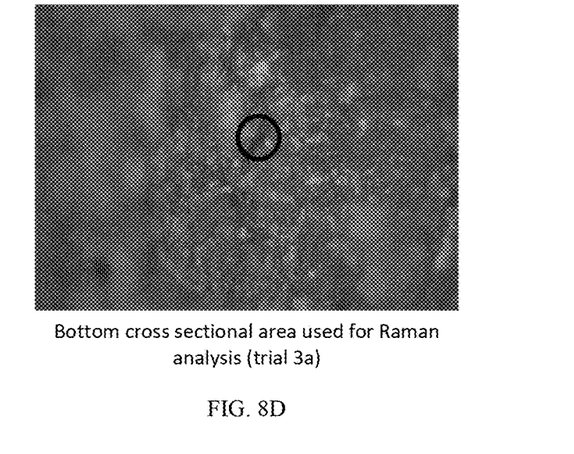
Figure 9:
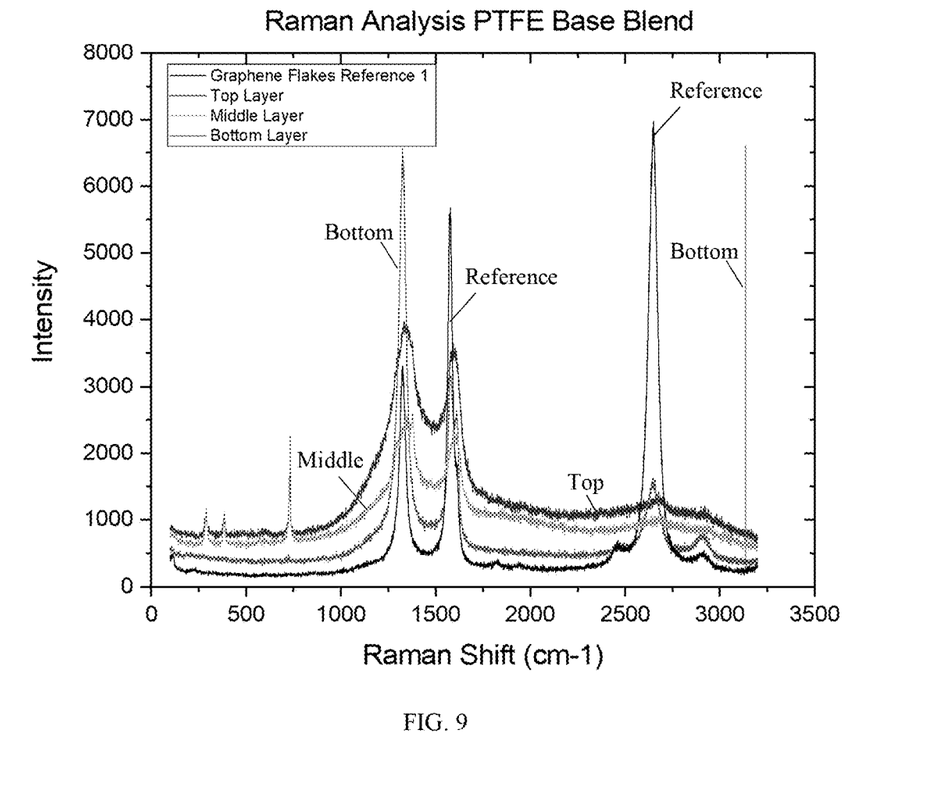
FIG. 9 is a graph of Raman analysis results for the indicated locations in FIGS. 8A-8D.

To compare the impact of graphene embedding, a "blend" embodiment example was made using a pristine graphene monolayer flakes concentration 1 mg/L and with sintering temp/time kept the same as regular seal production techniques. FIG. 8A shows a "blend" seal with a top, middle, and bottom area indicated corresponding to the micrograph images in FIG. 8B, FIG. 8C, and FIG. 8D, respectively. FIG. 9 is a graph of Raman analysis results for the indicated locations in FIGS. 8A-8D. The Raman spectra indicate the presence of graphene at all three locations, with a decreasing signal strength for graphene observed as one proceeds from "top" to "middle" to "bottom" of the seal cross section in FIG. 8A, indicating the presence of graphene in all three locations but a decreasing amount from the top down within the seal. The distinction between the top layer and the middle and bottom layers is more pronounced than in the 3G sample, suggesting a greater relative amount of surface or near-surface graphene (i.e. less penetration for embedding) than in the blend sample given the deposition on the surface for the solution processing used in this example.

Figure 10A:
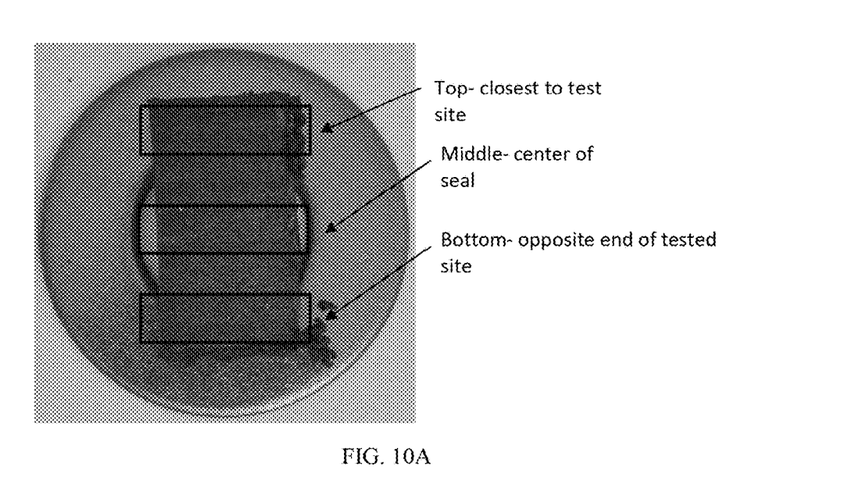
FIG. 10A shows a blend seal with a top, middle, and bottom area corresponding to the micrograph images in FIGS. 10B, 10C, and 10D, respectively.
Figure 10B:
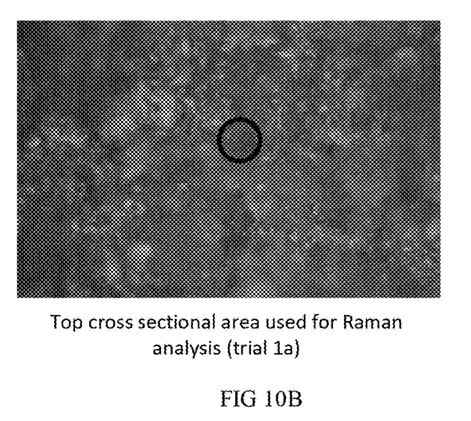
Figure 10C:
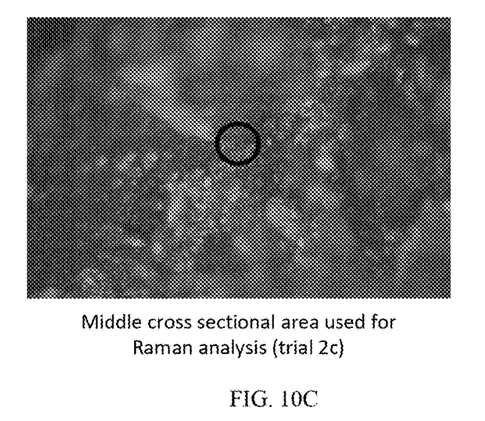
Figure 10D:
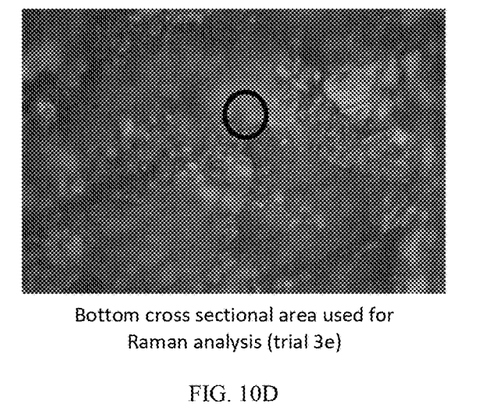
Figure 11:
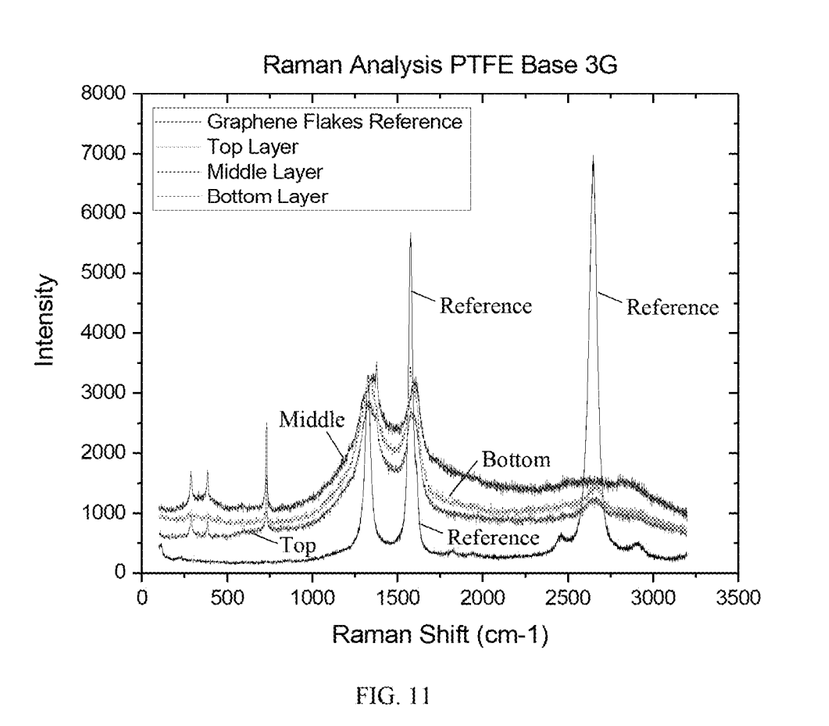
FIG. 11 is a graph of Raman analysis results for the indicated locations in FIGS. 10A-10D.

To compare the impact of graphene embedding, a "3G" embodiment example, the drop or soak process used a dipping of the seal or short exposure for 3-5 seconds and the drop-wise exposure utilized 3 drops on the seal surface. FIG. 10A shows a "blend" seal with a top, middle, and bottom area indicated corresponding to the micrograph images in FIGS. 10B, 10C, and 10D, respectively. FIG. 11 is a graph of Raman analysis results for the indicated locations in FIGS. 10A-10D. The Raman spectra indicate the presence of graphene at all three locations, with a decreasing signal strength for graphene observed as one proceeds from "top" to "middle" to "bottom" of the seal cross section in FIG. 8A, indicating the presence of graphene in all three locations but a decreasing amount from the top down within the seal. The distinction between the top layer and the middle and bottom layers is less pronounced than in the blend sample, suggesting a relatively similar amount of surface or near-surface graphene (i.e. significant penetration for embedding) than in the 3G sample given the immersion soak used in this example.

The 3G sample that was make utilizing an immersion process illustrated a more even distribution of graphene throughout the seal and reached a more stead-state COF in the testing (see FIGS. 4A-4D) compared to the base and blended samples and at a lower COF at that. This suggests improved performance for a graphene.

Definitions

No claim element herein is to be construed under the provisions of 35 U.S.C. § 112(f), unless the element is expressly recited using the phrase "means for."

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

What is claimed is:

1. A method of forming a graphene-embedded seal comprising:
   mixing graphene and alcohol forming a graphene alcohol solution; and
   cold pressing polymer powder to form a pressed seal powder;
   exposing the pressed seal powder to the graphene alcohol solution wherein a portion of the graphene alcohol solution infiltrates the pressed seal powder forming an infiltrated pressed seal powder; and
   sintering the infiltrated pressed seal powder forming a polymer seal having graphene embedded within the polymer seal.

2. The method of claim 1, wherein the graphene and alcohol solution comprises 0.1-10 mg/L of graphene.

3. The method of claim 2, wherein the graphene has an average lateral size of 150-3000 nm.

4. The method of claim 1, wherein the alcohol is ethanol.

5. The method of claim 1, wherein the polymer powder is polytetrafluoroethylene.

6. The method of claim 1, wherein exposing the pressed seal powder comprises soaking the pressed seal powder with the graphene alcohol solution.

7. The method of claim 1, wherein exposing the pressed seal powder is for 3-5 seconds.

8. The method of claim 1, wherein, prior to sintering, the alcohol is evaporated.

9. A method of forming a graphene-embedded seal comprising:
   mixing graphene and alcohol forming a graphene alcohol solution;
   exposing a polymer seal to the graphene alcohol solution wherein a portion of the graphene alcohol solution infiltrates pores of the polymer seal; and
   evaporating alcohol from the graphene alcohol solution.

10. The method of claim 9, wherein the graphene and alcohol solution comprises 0.1-10 mg/L of graphene.

11. The method of claim 10, wherein the graphene has an average lateral size of 150-3000 nm.

12. The method of claim 9, wherein the alcohol is ethanol.

13. The method of claim 9, wherein the polymer seal comprises polytetrafluoroethylene.

14. The method of claim 9, wherein exposing the polymer seal comprises submerging the polymer seal in the graphene alcohol solution for 5-10 seconds.

15. The method of claim 9, wherein exposing the polymer seal further comprises applying a vacuum to the polymer seal.

16. The method of claim 9, wherein exposing the polymer seal further comprises applying a pressure greater than atmospheric to the polymer seal.

17. A method of forming a graphene-embedded seal comprising:
   mixing graphene and alcohol forming a graphene alcohol solution;
   exposing a polymeric material to the graphene alcohol solution; and
   evaporating alcohol from the graphene alcohol solution, depositing graphene within the polymeric material.

18. The method of claim 17, wherein the polymeric material is a polymer powder.

19. The method of claim 17, wherein the polymeric material is a polymer seal.

* * * * *